US012762042B2

(12) United States Patent
Katru et al.

(10) Patent No.: US 12,762,042 B2
(45) Date of Patent: Oct. 13, 2026

(54) SYSTEM AND METHOD FOR GENERATING TEST DATA AND TESTCASES TO TEST AN APPLICATION PROGRAMMING INTERFACE

(71) Applicant: Ramanath Venkata Katru, Hyderabad (IN)

(72) Inventors: Ramanath Venkata Katru, Hyderabad (IN); Sai Prasad Matam, Pleasanton, CA (US); Siva Sundeep Nellore, Coppell, TX (US); Harikrishna Patnala, Hyderabad (IN)

(73) Assignee: Ramanath Venkata Katru, Hyderabad (IN)

( * ) Notice: Subject to any disclaimer, the term of this patent is extended or adjusted under 35 U.S.C. 154(b) by 267 days.

(21) Appl. No.: 18/652,829

(22) Filed: May 2, 2024

(65) Prior Publication Data

US 2025/0342105 A1 Nov. 6, 2025

(51) Int. Cl.
*G06F 11/3668* (2025.01)

(52) U.S. Cl.
CPC ...... *G06F 11/3684* (2013.01); *G06F 11/3688* (2013.01); *G06F 11/3696* (2013.01)

(58) Field of Classification Search
CPC ............. G06F 11/3696; G06F 11/3688; G06F 11/3684
See application file for complete search history.

(56) References Cited

U.S. PATENT DOCUMENTS 10,437,712 B1 * 10/2019 Tyler ................... G06F 11/3684
10,572,370 B2 * 2/2020 Bahrami ............. G06F 11/3676
2006/0101397 A1 * 5/2006 Mercer ............... G06F 11/3684 717/124
2023/0138180 A1 5/2023 Vasavan et al.
2023/0205678 A1 6/2023 Bollepally et al.
2024/0320130 A1 * 9/2024 Sondhi ...................... G06F 9/54
2025/0028629 A1 * 1/2025 Agrawal ............. G06F 11/3684

FOREIGN PATENT DOCUMENTS

CN 10783222 B 6/2021
CN 114968754 A * 8/2022 .......... G06F 11/3684

OTHER PUBLICATIONS

Hamza Ed-Douibi, Automatic Generation of Test Cases for Rest APIs: a Specification-Based Approach, Oct. 2018.

* cited by examiner

*Primary Examiner* — Phillip H Nguyen
(74) *Attorney, Agent, or Firm* — Jason C. Cameron

(57) ABSTRACT

A system for generating test data and testcases to test a set of application programming interface (API) is disclosed. The system includes a processing subsystem, which includes a trace collection module identifies the variable names and the corresponding the variable types to generate the schema, a schema inference module to generate and recognize a schema of the application programming interface (API), a semantic profile generation module includes a predefined set of semantic profiles, defines a custom semantic profile, divides the variable name into individual components, expand a plurality of abbreviated components to complete the filler words, a test case generation module generates a plurality of testcases using a data generated by the semantic profile, organize and group the generated test cases, a test execution and learning module executes the generated testcases and collect results, enables the user to override the generated test case.

20 Claims, 7 Drawing Sheets

SYSTEM AND METHOD FOR GENERATING TEST DATA AND TESTCASES TO TEST AN APPLICATION PROGRAMMING INTERFACE

FIELD OF INVENTION

Embodiments of a present disclosure relate to digital services and more particularly to a system for generating test data and testcases to test an application programming interface, and a method thereof.

BACKGROUND

A test case refers to the actions required to verify a specific feature or functionality in software application. The test case details the steps, data, prerequisites, and postconditions necessary to verify a feature. Test data is a set of data used by the test cases to determine whether an application is working correctly. The test data is used for both positive testing to verify that functions produce expected results for given inputs and for negative testing to test software ability to handle unusual, exceptional, or unexpected inputs. The test cases and their test data generation is the process of manually or automatically creating realistic but synthetic test data for testing an application under development. The automatic generation of test cases can effectively improve the efficiency of testing.

Further, the automatic system for generation of test cases mainly adopts model-based and formal-based methods, but both these methods require accurate modeling or formal description of the application requirements. These models require a high technical threshold and high application costs for developing architecture of an application. Modern application architectures consist of distributed systems using microservices that communicate with each other using representational state transfer (REST) based application programming interface (API). The Representational State Transfer (REST) application programming interface (API) is an architectural style for an API that uses Hypertext Transfer Protocol (HTTP) or secure (HTTPS) requests to access and manipulate data. REST APIs may be tested by executing REST API requests configured for a particular test case and comparing expected results with actual results of the request. The number of testcases, and the test data required is quite large and increases exponentially based on the API contents and the number of each individual APIs. The availability of realistic, high quality and diverse test data is also a challenge. Besides, the results are typically very large, and validation presents a significant data analysis problem.

Hence, there is a need for a system for generating test data and testcases to test an application programming interface and a method thereof that addresses the aforementioned issues.

OBJECTIVE OF THE INVENTION

An objective of the present invention is to deduce a schema based on multiple requests and responses pertaining to exchange of data using an API.

An objective of the present invention is to automatically generate test data and testcases for testing the application programming interface based on the deduced schema.

Another objective of the present invention is to enhance the generated testcases by using a learning model when the testcases are executed by the user.

BRIEF DESCRIPTION

In accordance with one embodiment of the disclosure, a system for generating test data and test cases to test application programming interface (API) is provided. The system includes a processing subsystem hosted on a server and configured to execute on a network to examine bidirectional communications among a set of microservices. The plurality of modules include a trace collection module, a schema inference module, a semantic profile generation module, a test case generation module, and a test execution and learning module. The trace collection module is operatively connected to the schema inference module. The trace collection module is configured to identify the one or more variable names and the corresponding one or more variable types to generate the schema. The schema inference module is configured to identify the variable names and their corresponding variable types to generate the schema. The schema inference module is configured to recognize and generate a schema of the API and its data related to the API, wherein the schema comprises one or more variable names and corresponding one or more variable types. A semantic profile generation module is operatively connected with the schema inference module. The semantic profile generation module comprises a predefined set of semantic profiles. The semantic profile generation module is configured to enable a user to define a custom semantic profile by a plugin mechanism in addition to the predefined set of semantic profiles. The semantic profile generation module is also configured to deduce the custom semantic profiles for all the parameters of the API using a plurality of heuristics and a plurality of pattern matching. Further, the semantic profile generation module is configured to apply constraints on a value pertaining to one or more variable types corresponding to one or more variable names. The semantic profile generation module is also configured to divide the variable name into several individual components based on a set of boundaries and then to filter out words that are ineffective to the semantic profile. Further, the semantic profile generation module is configured to expand the abbreviated components to complete words based on set of heuristics and patterns of the complete words and then to match the individual components with a predefined semantic profile names. The test case generation module is operatively connected to the schema inference module. The test case generation module is configured to generate a plurality of test cases using predefined data generated by the semantic profile. The plurality of test cases is a set of input data for testing the API. The test case generation module is also configured to organize and group the generated test cases into at least one of a several test suites, including regression test cases, security test cases, and negative test cases. The test execution and learning module is operatively connected to the test case generation module. Further, the test execution and learning module is configured to execute the generated test cases and collect the results of the execution. Furthermore, the test execution and learning module is configured to enable the user to refine the generated test cases upon providing input by the user in relation to the semantic profile.

In accordance with another embodiment, a method for generating test data and test cases to test the application programming interface is provided. The method includes identifying, by a trace collector module of the processing subsystem, one or more variable names and the corresponding one or more variable types to generate the schema. Further, the method includes recognizing and generating, by a schema inference module of a processing subsystem, a schema of the application programming interface (API) and related test data to test the API, wherein the schema comprises one or more variable names and corresponding to one or more variable types. The method also includes generating, by a semantic profile generation module of the processing subsystem, a predefined set of semantic profiles. Further, the method includes enabling, by the semantic profile generation module of the processing subsystem, a user to define a custom semantic profile via a plugin mechanism. Furthermore, the method includes deducing, by the semantic profile generation module of the processing subsystem, the semantic profile for all the parameters of an API using a set of heuristics and pattern matching. Furthermore, the method includes applying, by the semantic profile generation module of the processing subsystem, restriction on a value pertaining to one or more variable types corresponding to one or more variable names. Furthermore, the method includes dividing, by the semantic profile generation module of the processing subsystem, the variable name into several individual components based on a set of boundaries and then to filter out words that are ineffective to the semantic profile. Further, the semantic profile generation module is configured to expand the abbreviated components to complete words based on a set of heuristics and patterns of the complete words and then to match the individual components with a predefined semantic profile names. Furthermore, the method includes generating, by a test case generation module of the processing subsystem, a plurality of test cases using data generated by the semantic profiles, wherein the plurality of test cases is a set of input data for testing the API. Furthermore, the method includes organizing and grouping, by the test case generation module of the processing subsystem, the generated test cases into at least one of several test suites, including regression test cases, security test cases, and negative test cases. Furthermore, the method includes executing, by a test execution and learning module of the processing subsystem, the generated test cases and collecting results of the execution. Furthermore, the method includes enabling, by a test execution and learning module of the processing subsystem, the user to refine the generated test cases.

In accordance with another embodiment, a non-transitory computer-readable medium storing a computer program that, when executed by a processor, causes the processor to perform a method for generating test data and test cases to test the API. The method includes identifying, by a trace collection module of the processing subsystem, one or more variable names and the corresponding one or more variable types to generate the schema. The method also includes recognizing and generating, by a schema inference module of a processing subsystem, a schema of the API and related data for testing the API, wherein the schema comprises one or more variable names and corresponding one or more variable types. The method also includes generating, by a semantic profile generation module of the processing subsystem, a predefined set of semantic profiles. Further, the method includes enabling, by the semantic profile generation module of the processing subsystem, a user to define a custom semantic profile via a plugin mechanism. Furthermore, the method includes deducing, by the semantic profile generation module of the processing subsystem, the custom semantic profile for all of the parameters of the API using a set of heuristics and pattern matching. Furthermore, the method includes applying, by the semantic profile generation module of the processing subsystem, constraints on a value pertaining to one or more variable types corresponding to one or more variable names. Furthermore, the method includes dividing, by the semantic profile generation module of the processing subsystem, the variable name into several individual components based on a set of boundaries and then to filter out words that are ineffective to the semantic profile. Further, the semantic profile generation module is configured to expand the abbreviated components to complete words based on set of heuristics and patterns of the complete words and then to match the individual components with a predefined semantic profile names. Furthermore, the method includes generating, by a test case generation module of the processing subsystem, a plurality of testcases using a data generated by the semantic profile module, wherein the plurality of test cases and test input data for testing an API. Furthermore, the method includes organizing and grouping, by the test case generation module of the processing subsystem, the generated test cases into at least one of several test suites, including regression test cases, security test cases, and negative test cases. Furthermore, the method includes executing, by a test execution and learning module of the processing subsystem, the generated testcases and collecting results of the execution. Furthermore, the method includes enabling, by a test execution and learning module of the processing subsystem, the user to refine the generated test cases.

To further clarify the advantages and features of the present disclosure, a more particular description of the disclosure will follow by reference to specific embodiments thereof, which are illustrated in the appended figures. It is to be appreciated that these figures depict only typical embodiments of the disclosure and are therefore not to be considered limiting in scope. The disclosure will be described and explained with additional specificity and detail with the appended figures.

BRIEF DESCRIPTION OF THE DRAWINGS

The disclosure will be described and explained with additional specificity and detail with the accompanying figures in which.

Figure 1:
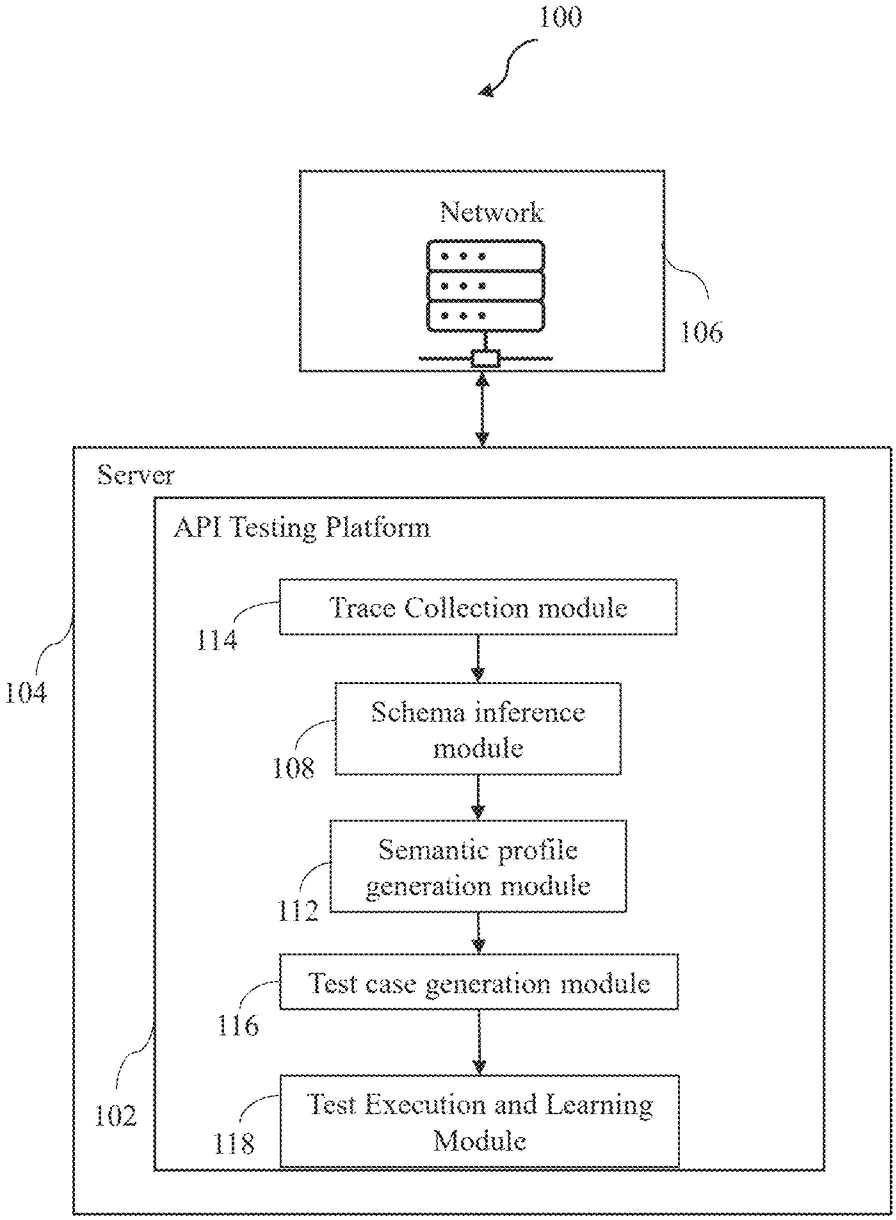
FIG. 1 is a block diagram representing a system for generating test data and testcases to test an application programming interface in accordance with an embodiment of the present disclosure.

Further, those skilled in the art will appreciate that elements in the figures are illustrated for simplicity and may not have necessarily been drawn to scale. Furthermore, in terms of the construction of the system, one or more components of the system may have been represented in the figures by conventional symbols, and the figures may show only those specific details that are pertinent to understanding the embodiments of the present disclosure so as not to obscure the figures with details that will be readily apparent to those skilled in the art having the benefit of the description herein.

DETAILED DESCRIPTION

For the purpose of promoting an understanding of the principles of the disclosure, reference will now be made to the embodiment illustrated in the figures, and specific language will be used to describe them. It will nevertheless be understood that no limitation of the scope of the disclosure is thereby intended. Such alterations and further modifications in the illustrated system, and such further applications of the principles of the disclosure as would normally occur to those skilled in the art, are to be construed as being within the scope of the present disclosure.

The terms "comprises", "comprising", or any other variations thereof, are intended to cover a non-exclusive inclusion, such that a process or method that comprises a list of steps does not include only those steps but may include other steps not expressly listed or inherent to such a process or method. Similarly, one or more devices or sub-systems or elements or structures or components preceded by "comprises . . . a" does not, without more constraints, preclude the existence of other devices, sub-systems, elements, structures, components, additional devices, additional sub-systems, additional elements, additional structures, or additional components. Appearances of the phrase "in an embodiment", "in another embodiment", and similar language throughout this specification may, but not necessarily do, all refer to the same embodiment.

Unless otherwise defined, all technical and scientific terms used herein have the same meaning as commonly understood by those skilled in the art to which this disclosure belongs. The system, methods, and examples provided herein are only illustrative and not intended to be limiting.

In the following specification and the claims, reference will be made to a number of terms, which shall be defined to have the following meanings. The singular forms "a", "an", and "the" include plural references unless the context clearly dictates otherwise.

Embodiments of the present disclosure relate to a system for generating test data and test cases to test application programming interface (API) is provided. The system includes a processing subsystem hosted on a server and configured to execute on a network to examine bidirectional communications among a set of microservices. The plurality of modules include a trace collection module, a schema inference module, a semantic profile generation module, a test case generation module, and a test execution and learning module. The trace collection module is operatively connected to the schema inference module. The trace collection module is configured to identify one or more variable names and the corresponding one or more variable types to generate the schema. The schema inference module is configured to identify the variable names and their corresponding variable types to generate the schema. The schema inference module is configured to recognize and generate a schema of the API and its data related to the API, wherein the schema comprises one or more variable names and corresponding one or more variable types. A semantic profile generation module is operatively connected with the schema inference module. The semantic profile generation module comprises a predefined set of semantic profiles. The semantic profile generation module is configured to enable a user to define a custom semantic profile by a plugin mechanism in addition to the predefined set of semantic profiles. The semantic profile generation module is also configured to deduce the custom semantic profiles for all the parameters of the API using a plurality of heuristics and a plurality of pattern matching. Further, the semantic profile generation module is configured to apply constraints on a value pertaining to one or more variable types corresponding to one or more variable names. The semantic profile generation module is also configured to divide the variable name into several individual components based on a set of boundaries and then to filter out words that are ineffective to the semantic profile. Further, the semantic profile generation module is configured to expand the abbreviated components to complete words based on set of heuristics and patterns of the complete words and then to match the individual components with a predefined semantic profile names. The test case generation module is operatively connected to the schema inference module. The test case generation module is configured to generate a plurality of test cases using predefined data generated by the semantic profile. The plurality of test cases is a set of input data for testing the API. The test case generation module is also configured to organize and group the generated test cases into at least one of a several test suites, including regression test cases, security test cases, and negative test cases. The test execution and learning module is operatively connected to the test case generation module. Further, the test execution and learning module is configured to execute the generated test cases and collect the results of the execution. Furthermore, the test execution and learning module is configured to enable the user to refine the generated test cases upon providing input by the user in relation to the semantic profile.

FIG. 1 is a block diagram representing a system for generating the test data and test cases to test an application programming interface (API) in accordance with an embodiment of the present disclosure. The system 100 includes a processing subsystem 102.

The processing subsystem 102 is hosted on a server 104, wherein the processing subsystem 102 is configured to observe 106 to capture communications among all the microservices. In one embodiment, the system 106 may include several microservices. The plurality of modules includes a trace collection module 114, a schema inference module 108, a semantic profile generation module 112, a test case generation module 116, and a test execution and learning module 118.

The schema inference module 108 is configured to recognize and infer a schema of the API 110. In one embodiment, the schema is metadata that describes a format of the data exchanged, for instance, variables, types of variables including strings, and integers. In one embodiment, the schema describes a plurality of resources, endpoints, supported operations, and representations of the web API. The schema includes one or more variable names and corresponding one or more variable types. For example, the variable name includes accountNum, and variable type is number.

In one embodiment, the application programming interface (API) 110 is a way of communication between two or more computer applications. It is a type of application interface, which offers a service to other pieces of applications. In one embodiment, the semantic profile generation module 112 is configured to match the variable name with a predefined semantic profile using at least one of a fuzzy dictionary search, pattern matching, or heuristics match related to the web API variable names. In one embodiment, an application may contain one or more APIs that use input data entered in the application, process the data, and return output in the form of data, maps, or files. In one embodiment, the API may be a third-party Login API, API for e-commerce applications, weather-related application API, and the like.

In one embodiment, the agent is a plurality of implementations that inject instrumented steps into an existing microservice executable at run-time using various techniques based on the language used. In one embodiment, microservices are an architectural and organizational approach to application development where the application is composed of small independent services that communicate over well-defined set of APIs. Also, the microservices may be an e-commerce web portal that may have a user interface (UI) and inventory management and shipping. Using the agent for microservices, specifically, the traces generated by the agent, the API call details may be gathered, and all the service level function calls executed for that given API call on a microservice, generally referred to as spans. These spans normally are in the form of a stack of entries starting with the API call that is done over Hypertext Transfer Protocol (HTTP) along with the parameters and the response that may be returned by the service, and subsequent API calls or function calls to other services (external or internal) including database operations. Using this information, the API call-flow and service interdependencies may be deduced.

The semantic profile generation module 112 is operatively connected with the schema inference module 108 wherein the semantic profile generation module 112 comprises a predefined set of semantic profiles. In one embodiment, the semantic profile is a technique for gaining a deeper understanding of the information being stored and manipulated in an existing system where the semantic profile is used. The semantic profile generation module 112 is configured to enable a user to define a custom semantic profile by a plugin mechanism. In one embodiment, the custom semantic profile is defined by the user based on the user requirements. In another embodiment, the custom semantic types augment the system knowledge semantic types used to identify and create a profile data. In one embodiment, the plug-in mechanism adds new functions to the system without altering the host application. The semantic profile generation module 112 is also configured to deduce the custom semantic profile for a plurality of parameters using a set of heuristics and pattern matching. In one embodiment, the plurality of parameters may include a value parameter, a reference parameter, an output parameter, and a parameter array. In one embodiment, pattern matching is a technique that identifies specific patterns or sequences or a combination of characters within a larger piece of information. The heuristic is a problem-solving strategy or method designed to find a satisfactory solution in a reasonable amount of time by using well established patterns. Further, the semantic profile generation module 112 is configured to apply restrictions on a value pertaining to one or more variable types corresponding to one or more variable names. In one embodiment, the semantic profile generation module 112 generates predefined data including the variable name, a data type, actual values of the variable, a pattern of the value, properties of the value, length of variable strings, purpose of the variable, and a data profile. The data profile comprises a validator function for returning a true value upon matching the data with the semantic profile and a false value upon mismatching of the data with the semantic profile.

The trace collection module 114 is operatively connected to the schema inference module 108 and the semantic profile generation module 112. The trace collection module 114 is configured to identify one or more variable names and the corresponding one or more variable types to generate the schema.

The semantic profile generation module 112 is configured to divide the variable name into individual components based on a set of boundaries to filter out the words ineffective to the semantic profile. The semantic profile generation module 112 is also configured to expand a plurality of abbreviated components to complete the words based on a plurality of heuristics and a plurality of patterns of the complete words to match the plurality of individual components with a predefined semantic profile name. In one embodiment, the semantic profile generation module 112 is configured to validate the data against each of the semantic profiles and refine the match based on the user input for the semantic profile.

The test case generation module 116 is operatively connected to the schema inference module 108. The test case generation module 116 is configured to generate a plurality of test cases using the predefined data generated by the semantic profile. The plurality of test cases is a set of input data for an operation of the API. The test case generation module 116 is also configured to organize and group the generated test cases into at least one of a plurality of test suites, including regression test cases, security test cases, and negative test cases. In one embodiment, the generated test data is matched with the predefined semantic profile names and for each mismatch. In such an embodiment, a Levenshtein distance calculation method is used to find a closest semantic profile. In one embodiment, The Levenshtein distance is a number that indicates difference between two strings. The higher the number, the more different the two strings are.

The test execution and learning module 118 is operatively connected to the test case generation module 116. The test execution and learning module 118 is configured to execute the generated test cases and collect the results of the execution. The test execution and learning module 118 is also configured to enable the user to override the generated test cases upon providing input by the user in relation to the semantic profile. The learning model can recognize complex patterns in pictures, text, and other data to produce accurate insights and predictions. In one embodiment, the learning model learns failed test cases based on multiple factors, including the duration and execution status of test cases. In one embodiment, the learning module is configured to continuously update the testcases by learning from the collected results of the executed test cases on a system under test 106, wherein the system under test 106 is a system being tested for correct execution of the test cases.

In one embodiment, the test execution and learning module 118 perform continuous learning. The process of continuous learning along with optional user input, is based on the test suites that are executed each time. The execution of test suites is used for improving the test cases over time. The process of continuous learning includes refining the min or max or max-length properties for a data profile of the user using the real-world data that was captured during test runs. The test runs of the test cases may be further enhanced by user input. The process of continuous learning also includes inferring proper responses of the API such as 2XX, 4XX codes and 2XX OK for an invalid API call, but an error is given in the response body. In one embodiment, a 2XX represents success status which means that the request is successful, and the browser has received the expected information. On one embodiment, 4XX is an error that often occurs when a webpage doesn't exist or has restricted access or rights. In one embodiment, 2XX OK indicates that the request has succeeded. Further, the process of continuous learning includes removal of false positives based on the responses obtained. For example, if an API is returning an error each time, and the process is expecting a normal response, the false positive may be eliminated by updating the error criteria.

Figure 2:
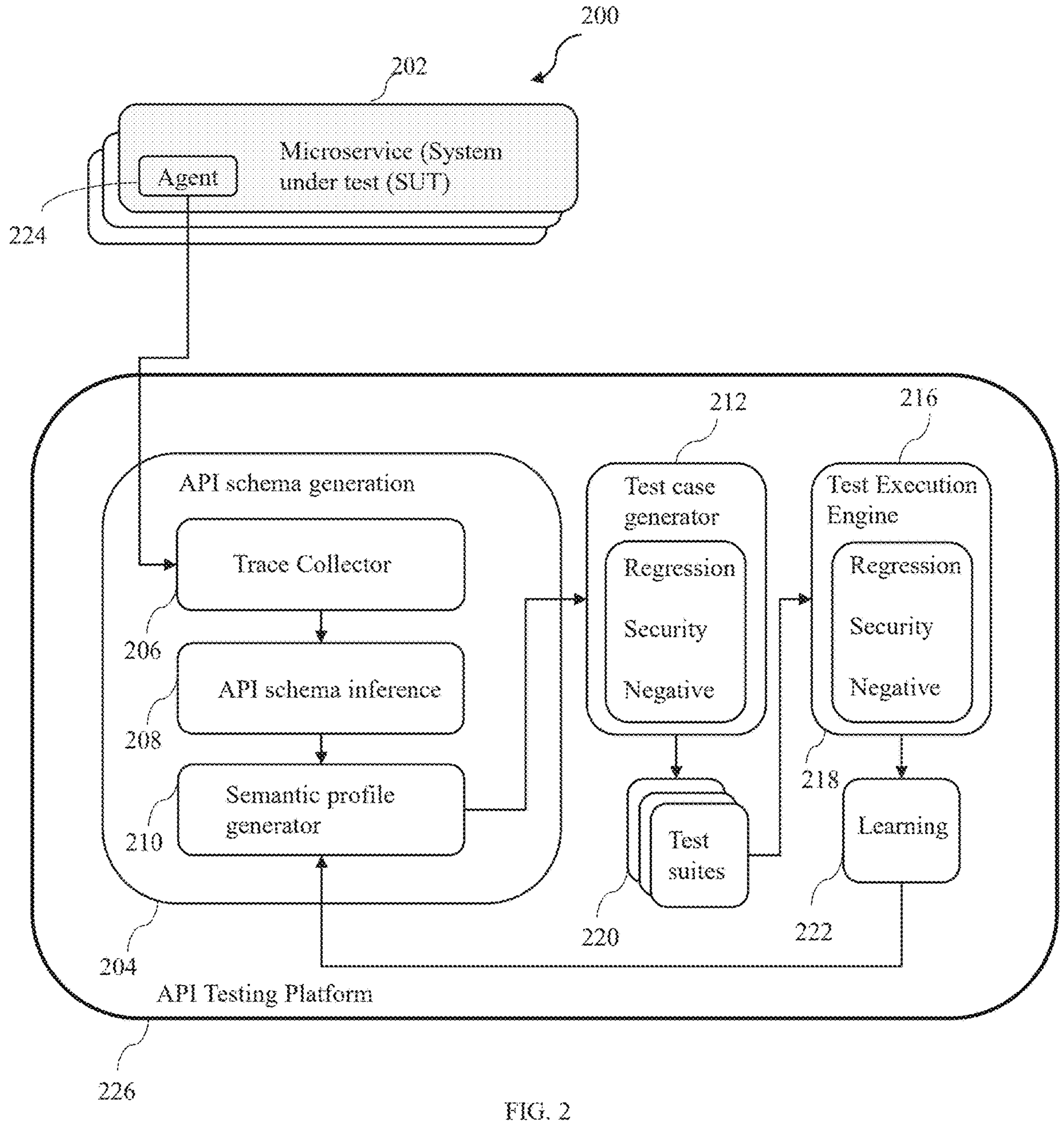
FIG. 2 is a block diagram of an exemplary embodiment of an architecture of the system by capturing request and response traces from system under test for inferring application programming interface (API) schema, generating a semantic profile, generating test data, generating test cases in many categories, generating test suites, to test an API and learning based on test execution of FIG. 1 in accordance with an embodiment of the present disclosure.

FIG. 2 is a block diagram of an exemplary embodiment of an architecture of the system by capturing request and response traces from system under test for inferring application programming interface (API) schema, generating a semantic profile, generating test data, generating test cases in many categories, generating test suites, to test an API and learning based on test execution of FIG. 1 in accordance with an embodiment of the present disclosure. In one embodiment, the system is a distributed application system 202. In one embodiment, for API schema inference 208, trace collector 206 gathers request and response traces. A schema inference 208 generates a schema for the API. In one embodiment, the data profile for an API variable may include a Social Security number (SSN), an account number, an identification number (ID) number, an MD5 Hash, an address, a name, a phone no, and the like. Each profile may have a validator function that returns true when the data profile matches the semantic profile and false when the data profile doesn't match the semantic profile. After observing the API, inferring the schema for it and the semantic profile generator 210 generates all semantic profiles, a test case generator 212 generates a test suite 220. The generated test suits are executed by a test execution engine 216. In one embodiment, the learning 222 of an output of execution of the test suit 220 is provided to the Semantic profile generator 210. In one embodiment, the test suites are the test cases that are organized and grouped.

In one embodiment, the test suites may include regression test cases which are the captured traces replayed, security test cases like field fuzzing, negative test cases like border conditions for each field. In one embodiment, the generated suites may be functional test cases, negative test cases, and range attributes 214. In one embodiment, the range attribute is used to specify a range of values to be provided for an individual parameter of a parameterized API. After generating the test suites, the test execution module 216 runs the test cases. The test execution module 216 executes the functional test cases, the security test cases, and the range attributes 218. The result of execution is learned by the learning module 222. The learning is used for updating the test cases and test suites as per the user requirements. The learning module 222 continuously learns from the user input and patterns from the data gathered from the request and response of an API.

Figure 3:
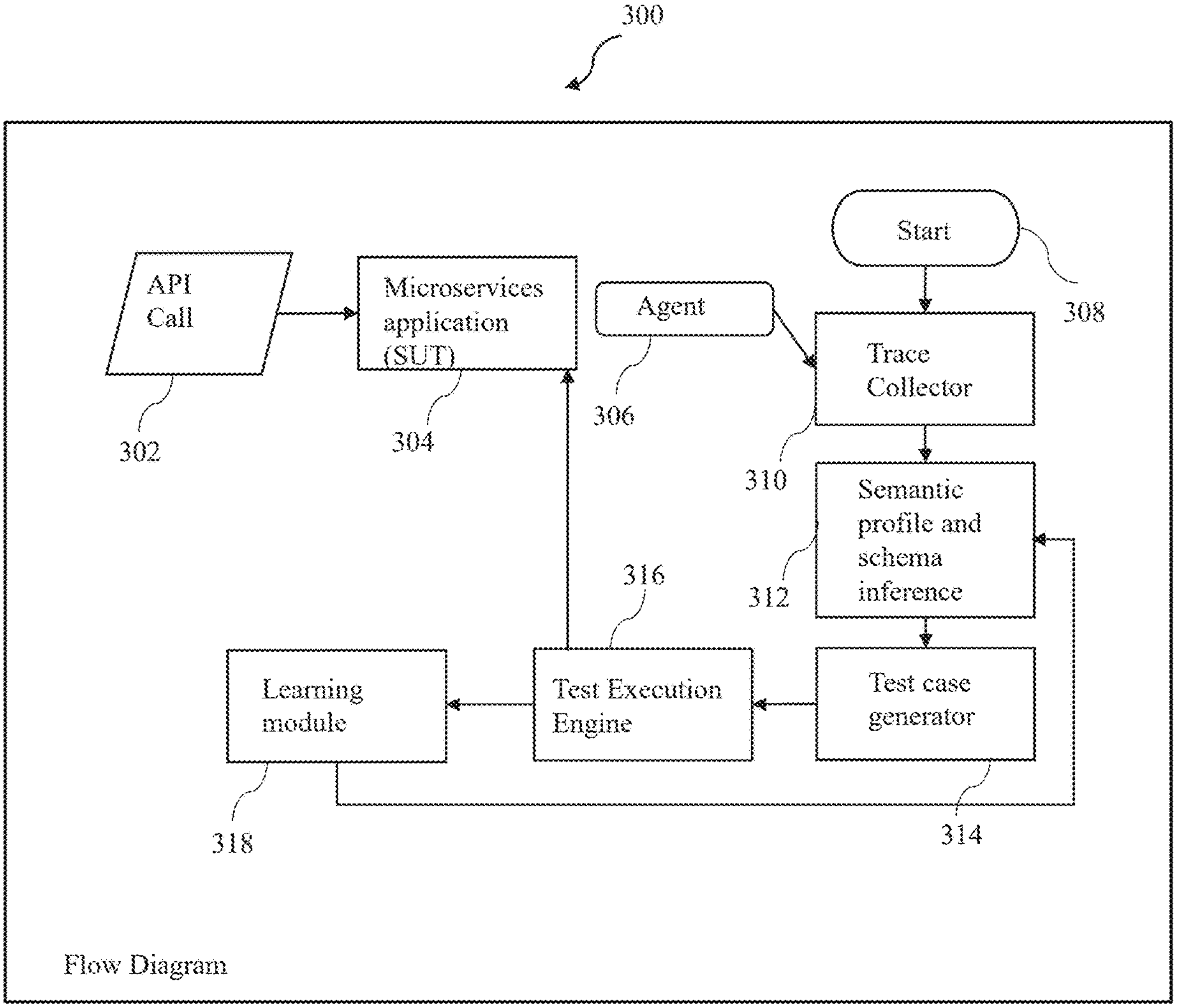
FIG. 3 is a flow chart representing steps involved in a workflow of the system by capturing request and response traces from system under test (SUT) for inferring API schema, generating a semantic profile, generating test data, test cases to test an API and learnings based on test execution of FIG. 1 in accordance with an embodiment of the present disclosure.

FIG. 3 is a flow chart representing steps involved in a workflow of the system by capturing request and response traces from system under test (SUT) for inferring API schema, generating a semantic profile, generating test data, test cases to test an API and learnings based on test execution of FIG. 1 in accordance with an embodiment of the present disclosure. The workflow starts at 308 with the trace collector module 310 observing the API for which the test data is to be generated. In one embodiment, the traces are also generated by the agent 306. The data profile and API schema is generated by the API schema inference module 108 and the semantic profile generator 312. The test case generator 314 generates the test suites and test cases. The generated test cases are executed by the test case executor 316. The result of the test case execution is sent to the learning module 318. In one embodiment, the test case consists of the set of input data for an API call 302, along with the expected status of the API call and the output data that needs to be verified on the system and microservices application 304. For all the APIs recognized from traces of the distributed application system being tested. The distributed application systems use API call 302. The executed test cases are learned by the learning module 318. The learning module 318 is trained by learning the execution results and updates the schema inference module and the semantic profile generator 312 for implementing corrections in the test suites.

Figure 4:
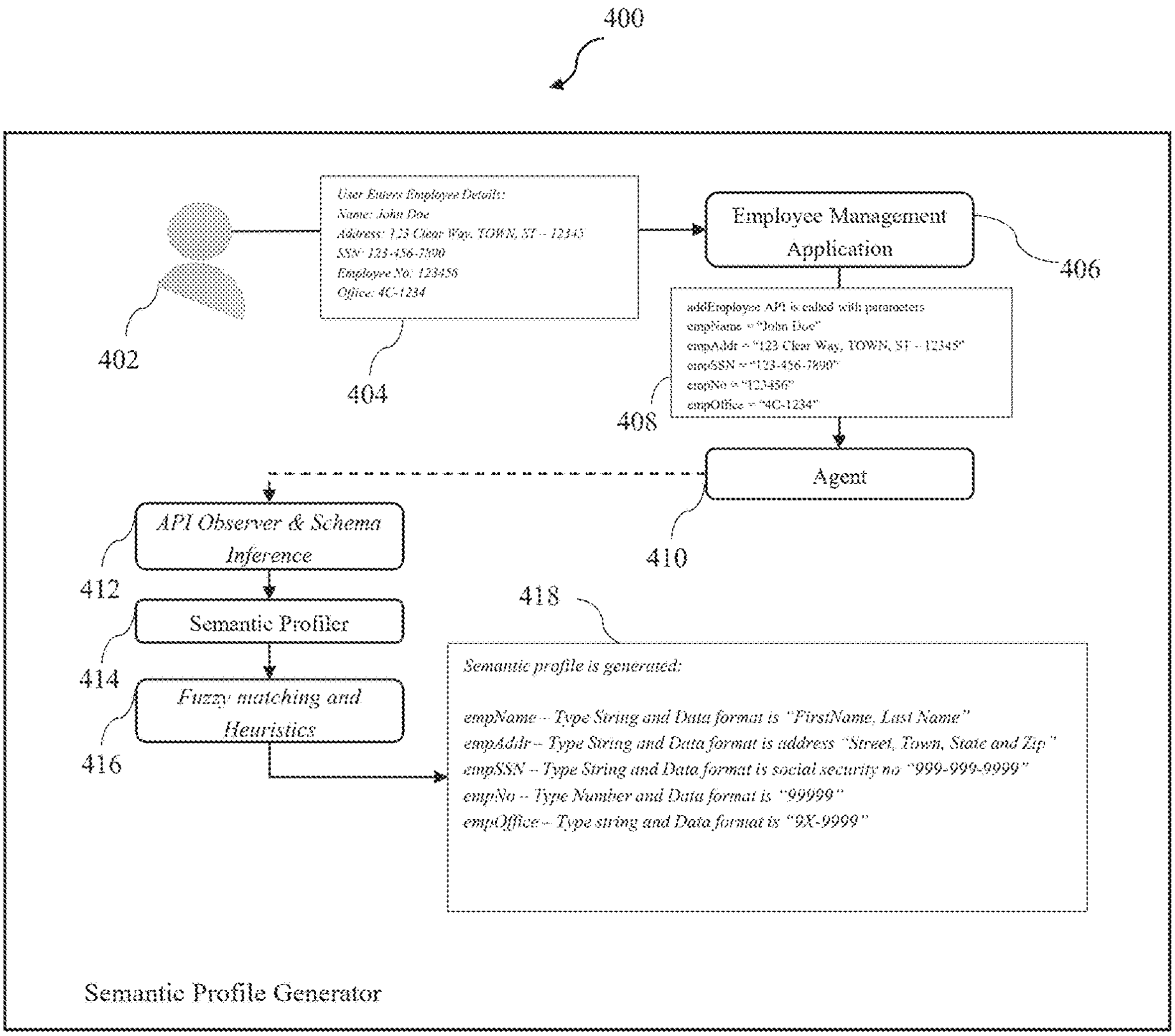
FIG. 4 is a flow chart representing steps involved in an exemplary embodiment of the system by capturing request and response traces from SUT for inferring API schema, generating a semantic profile based on heuristics and pattern matching techniques to test an API of FIG. 1 in accordance with an embodiment of the present disclosure.

FIG. 4 is a flow chart representing steps involved in an exemplary embodiment of the system for generating test data and test cases to test API of FIG. 1 in accordance with an embodiment of the present disclosure. Consider that the system 100 stores information about employees. The system provides operations to enter new employee records, update the records and delete the records. This distributed application consists of the microservices such as employee management user interface (GUI) 406, API server/agent 410, employee data handler, and database. The flow for an add employee 408 API call starts with a user 402 entering employee details. Consider an employer with employee details that includes:

[Name: John Doe Address: 123 Clear Way, TOWN, ST—12345 SSN: 123-456-7890 Employee No: 123456 Office: 4C-1234] 404

The employee details are added and via API server the added details are observed by the trace collector module. The schema inference 412 generates a schema for generating data profile for the added employee. The semantic profile generator 414 generates a data profile for the added employee. In one embodiment, by using fuzzy matching and heuristics 416 a semantic profile for the employee is generated 418. The semantic profile may include employee name, employee address, employee number, SSN number, and employee office address. The type of data format and string added is:

empName—Type String and Data format is "FirstName, Last Name" empAddr—Type String and Data format is address "Street, Town, State and Zip" empSSN—Type String and Data format is social security no "999-999-9999" empNo—Type Number and Data format is "99999" empOffice—Type string and Data format is "9X-9999 418.

Figure 5:
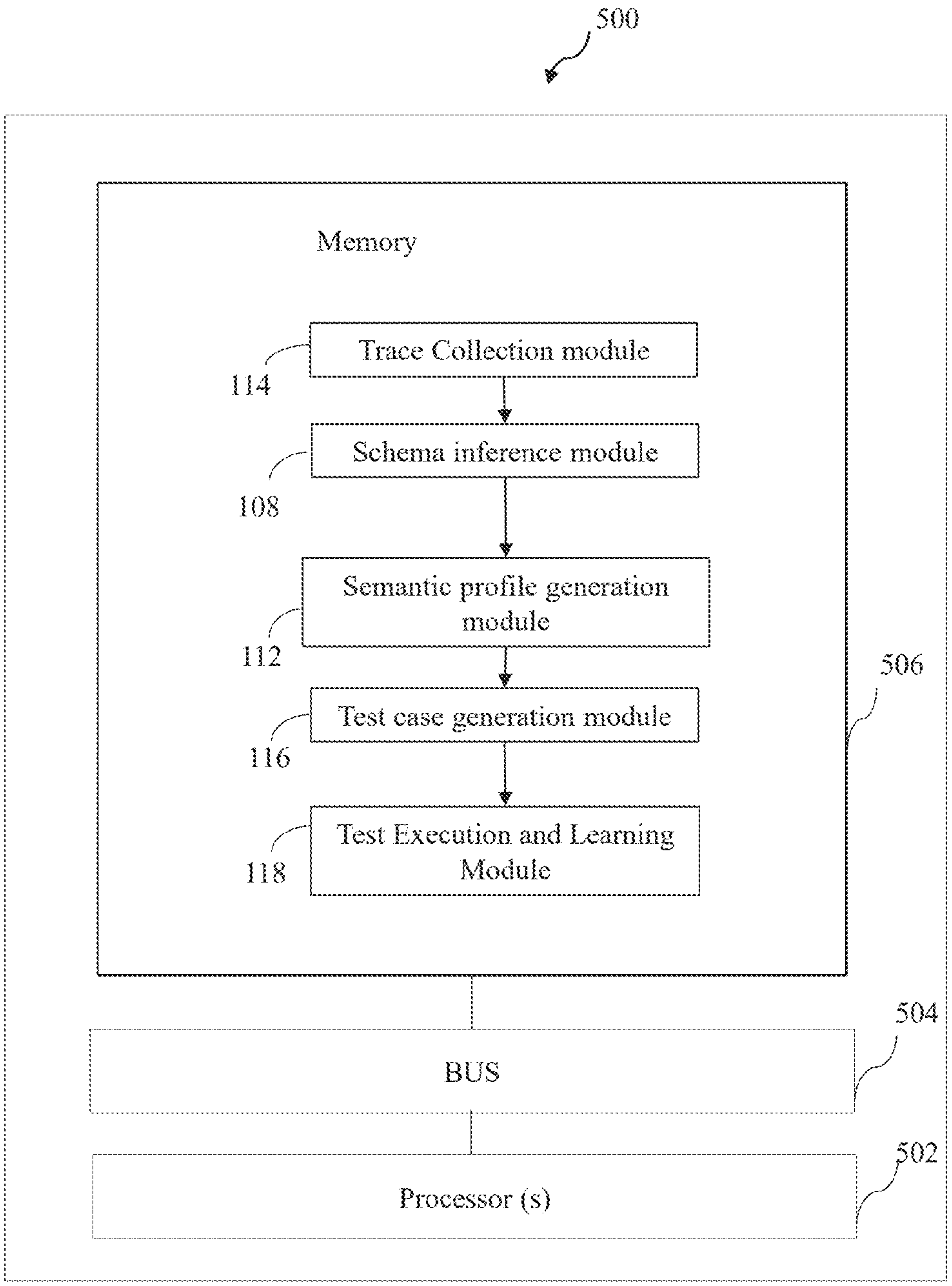
FIG. 5 is a block diagram of a computer or a server for a system for generating test data and testcases to test an application programming interface in accordance with an embodiment of the present disclosure.

FIG. 5 is a block diagram of a computer or a server for the system for generating test data and test cases to test an application programming interface in accordance with an embodiment of the present disclosure. The server includes processor(s) 502, and memory 506 operatively coupled to the bus 504.

The processor(s) 502, as used herein, means any type of computational circuit, such as, but not limited to, a microprocessor, a microcontroller, a complex instruction set computing microprocessor, a reduced instruction set computing microprocessor, a very long instruction word microprocessor, an explicitly parallel instruction computing microprocessor, a digital signal processor, or any other type of processing circuit, or a combination thereof.

The bus 504 as used herein refers to the internal memory channels or computer network that is used to connect computer components and transfer data between them. The bus 504 includes a serial bus or a parallel bus, wherein the serial bus transmits data in bit-serial format and the parallel bus transmits data across multiple wires. The bus 504 as used herein, may include but not limited to, a system bus, an internal bus, an external bus, an expansion bus, a frontside bus, a backside bus, and the like.

The memory 506 includes a plurality of subsystems and a plurality of modules stored in the form of executable program which instructs the processor 502 to perform the method steps illustrated in FIG. 1. The memory 506 is substantially similar to the system 100 in FIG. 1. The memory 506 has the following submodules: a schema inference module 108, a semantic profile generation module 112, a trace collection module 114, a test case generation module 116, and a test execution and learning module 118.

The schema inference module 108 is configured to generate and recognize a schema of the API 110 and a plurality of data related to the API 108, wherein the schema comprises one or more variable names and corresponding one or more variable types. The schema inference module 108 is configured to generate and recognize a schema of the API 110 and a plurality of data related to the API 108, wherein the schema comprises one or more variable names and corresponding one or more variable types.

The semantic profile generation module 112 is operatively connected with the schema inference module 108 wherein the semantic profile generation module 112 comprises a predefined set of semantic profiles. The semantic profile generation module 112 is configured to enable a user to define a custom semantic profile by a plugin mechanism. The semantic profile generation module 112 is also configured to deduce the custom semantic profile for a plurality of parameters using a plurality of heuristics and a plurality of pattern matching. Further, the semantic profile generation module 112 is configured to apply restrictions on a value pertaining to one or more variable types corresponding to one or more variable names.

The semantic profiling module 112 is configured to divide the variable name into several individual components based on a set of boundaries and then to filter out the words that are ineffective to the semantic profile. Further, the semantic profiling module 112 is configured to expand the abbreviated components to complete the words based on a set of heuristics and patterns of the complete words, and then to match the individual components with a predefined semantic profile name.

The test case generation module 116 is operatively connected to the schema inference module 108. The test case generation module 116 is configured to generate a plurality of testcases using predefined data generated by the semantic profile. The plurality of test cases is a set of input data for testing of an API. The test case generation module 116 is also configured to organize and group the generated test cases into at least one of a plurality of test suites, including regression test cases, security test cases, and negative test cases.

The test execution and learning module 118 is operatively connected to the test case generation module 116. The test execution and learning module 118 is configured to execute the generated testcases and collect results of the execution. The learning module 118 is also configured to enable the user to override the generated test cases upon providing an input by the user in relation to the semantic profile.

Computer memory elements may include any suitable memory device(s) for storing data and executable program, such as read only memory, random access memory, erasable programmable read only memory, electrically erasable programmable read only memory, hard drive, removable media drive for handling memory cards and the like. Embodiments of the present subject matter may be implemented in conjunction with program modules, including functions, procedures, data structures, and application programs, for performing tasks, or defining abstract data types or low-level hardware contexts. Executable program stored on any of the above-mentioned storage media may be executable by the processor(s) (502).

Figure 6A:
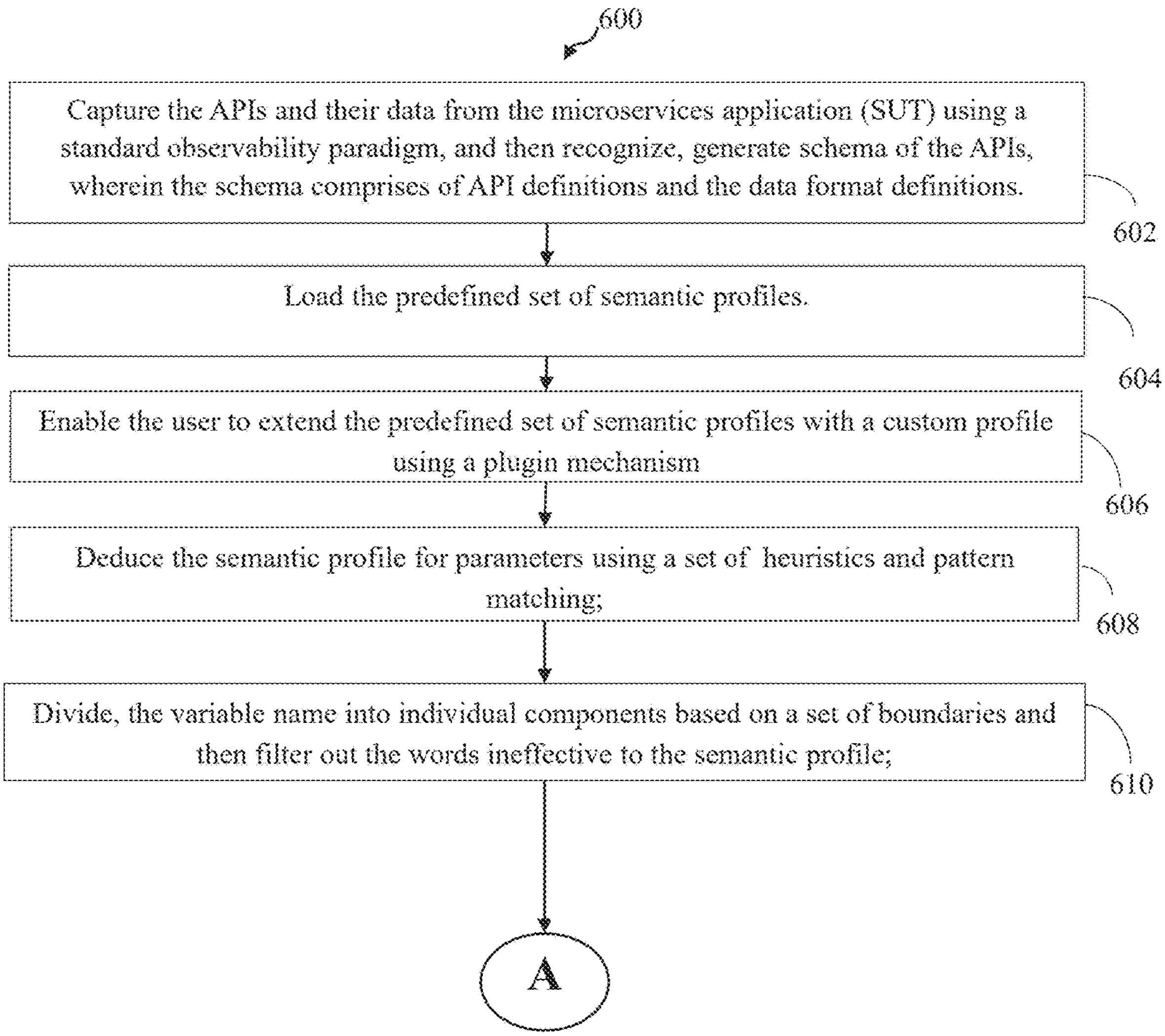
FIG. 6*a* is a flow chart representing steps involved in a method for generating test data and test cases to test application programming interface in accordance with an embodiment of the present disclosure.
Figure 6B:
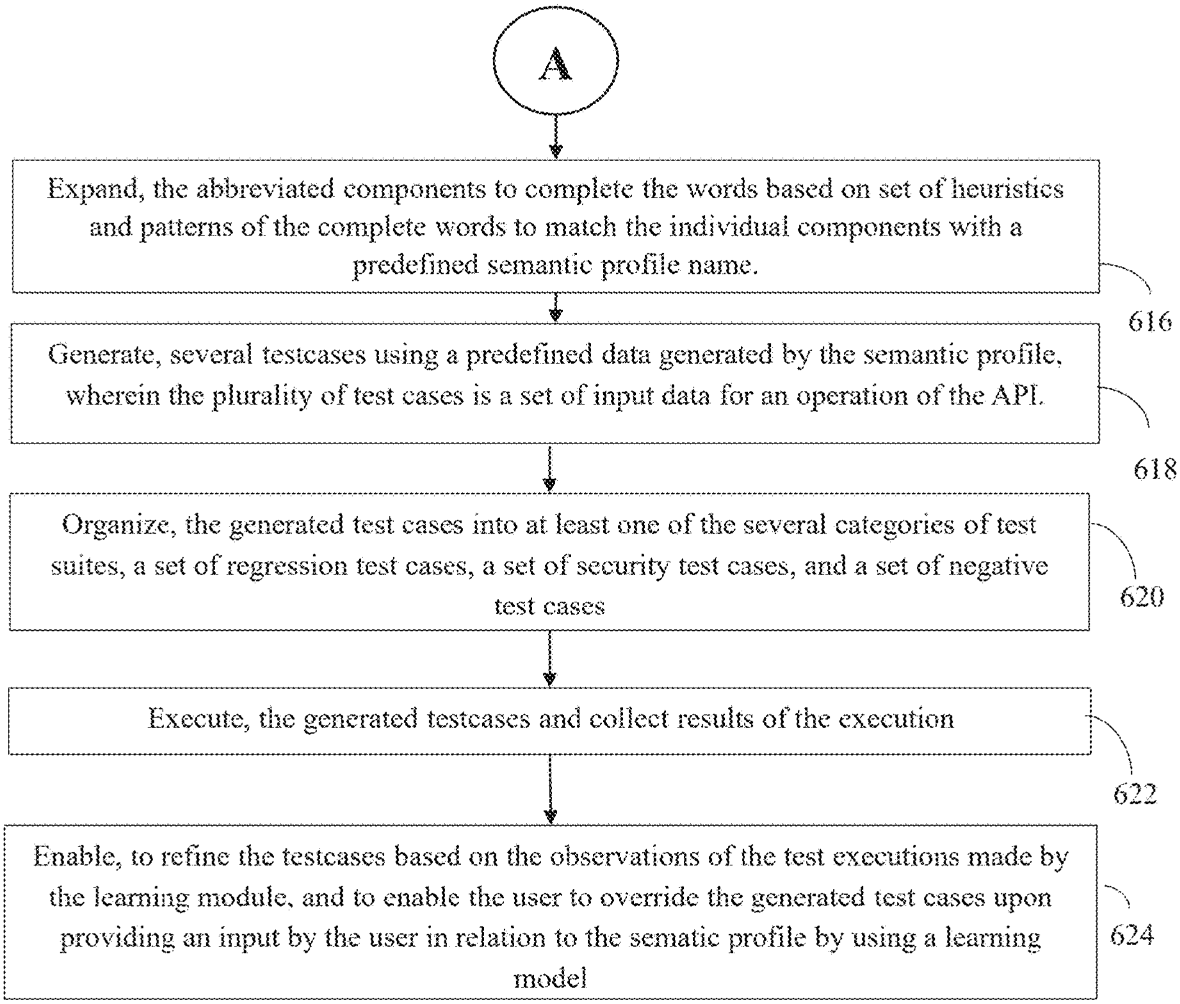
FIG. 6*b* illustrates continued steps involved in the method for generating test data and test cases to test application programming interface of FIG. 6*a* in accordance with an embodiment of the present disclosure.

FIG. 6*a* is a flow chart representing steps involved in a method for generating test data and test cases to test application programming interface in accordance with an embodiment of the present disclosure and FIG. 6*b* illustrates continued steps involved in the method for generating test data and test cases to test API of FIG. 6*a*.

The method 600 includes recognizing, and generating, by a schema inference module of a processing subsystem, a schema of an API and a plurality of data related to the API, wherein the schema comprises one or more variable names and corresponding one or more variable types in step 602. The method also includes generating test cases to test a plurality of aspects of multiple APIs upon generating the schema.

The method 600 also includes generating, by a semantic profile generation module of the processing subsystem, a predefined set of semantic profiles in step 604. In one embodiment, the semantic profile comprises the variable name, a data type, actual values of the variable, a pattern of the value, properties of the value, length of variable strings, purpose of the variable, and a data profile.

Further, the method 600 includes enabling, by the semantic profile generation module of the processing subsystem, a user to define a custom semantic profile by a plugin mechanism in step 606.

Furthermore, the method 600 includes deducing, by the semantic profile generation module of the processing subsystem, the custom semantic profile for a plurality of parameters using a plurality of heuristics and a plurality of pattern matching in step 608. The method also includes validating, data profile for returning a true value upon matching the data with the semantic profile and a false value upon mismatching of the data with the semantic profile.

Furthermore, the method 600 includes applying, by the semantic profile generation module of the processing subsystem, restriction on a value pertaining to one or more variable types corresponding to the one or more variable names in step 610. The method also includes using a sample data for validating the test data against each of the semantic profiles. The method also includes refining the words matched with the predefined semantic profile names.

Furthermore, the method 600 includes identifying, by the trace collection module of the processing subsystem, one or more variable names and the corresponding one or more variable types to generate the schema in step 612.

Furthermore, the method 600 includes dividing, by the semantic profile generation module of the processing subsystem, the variable name into several individual components based on a set of boundaries to filter out a plurality of words ineffective to the semantic profile in step 614.

Furthermore, the method 600 includes expanding, by the semantic profiling module of the processing subsystem, a plurality of abbreviated components to complete the words based on a plurality of heuristics and a plurality of patterns of the complete words to match the plurality of individual components with a predefined semantic profile name in step 616.

Furthermore, the method 600 includes generating, by a test case generation module of the processing subsystem, a plurality of testcases using a predefined data generated by the semantic profile, wherein the plurality of test cases is a set of input data for an operation of an API in step 618. The method also includes a set of positive tests cases and a set of negative test cases for validating the test data. The method also comprises implementing, a correction or an update to the system based on the test results associated with the test cases.

Furthermore, the method 600 includes organizing and grouping, by the test case generation module of the processing subsystem, the generated test cases into at least one of several test suites, including regression test cases, security test cases, and negative test cases in step 620. The method also includes automatically generating the test data and the testcases for a set of APIs, wherein the API is a public API. The method also includes generating synthetic test data using a dictionary search, pattern matching, and heuristics specific to the API and its related variables and data.

Furthermore, the method 600 includes executing, by a test execution and learning module of the processing subsystem, the generated testcases and collecting results of the execution in step 622.

Furthermore, the method 600 includes enabling, by a test execution and learning module of the processing subsystem, to refine the testcases based on the observations of the test executions made by the learning module, and to enable the user to override the generated test cases upon providing an input by the user in relation to the semantic profile generated in 624.

In one embodiment, the method includes generating a schema by observing the API through the traces generated by the trace collection module. The method also includes identifying the API request call that went through HTTP. The method also includes finding the Response returned to the request via HTTP. The method also includes parsing the API Request and finding out the various parts-Headers, uniform resource locator (URL), parameters, body, and path parameters. The method also includes using a plurality of steps, deduce the semantic profile of URL parameters and URL path-parameters. The method also includes parsing the API response and finding the response code, status, and the response body in JSON format. The method also includes using JSON parsing method, to find out the response schema along with the datatypes given the response body. The method also includes generating API Schema in Open API format.

Various embodiments of the present disclosure provide a system and a method for automatically generating test data and testcases for testing a set of APIs. The test execution and learning module of the system disclosed in the present disclosure updates the generated testcases by using learning model when the testcases are executed, this reduces occurrences of error during execution. The semantic profiling module of the system is able to expand the abbreviated components of the variable names to complete the words based on a plurality of heuristics and a plurality of patterns of the complete words to match the plurality of individual components with the predefined semantic profile names.

While specific language has been used to describe the disclosure, any limitations arising on account of the same are not intended. As would be apparent to a person skilled in the art, various working modifications may be made to the method in order to implement the inventive concept as taught herein.

The figures and the foregoing description give examples of embodiments. Those skilled in the art will appreciate that one or more of the described elements may well be combined into a single functional element. Alternatively, certain elements may be split into multiple functional elements. Elements from one embodiment may be added to another embodiment. For example, the order of processes described herein may be changed and are not limited to the manner described herein. Moreover, the actions of any flow diagram need not be implemented in the order shown; nor do all of the acts need to be necessarily performed. Also, those acts that are not dependent on other acts may be performed in parallel with the other acts. The scope of embodiments is by no means limited by these specific examples.

We claim:

1. A computer-implemented system for generating test data and test cases to examine an application programming interface comprising:
  a processor;
  a memory operatively coupled to the processor, wherein the memory stores a processing subsystem comprising a plurality of modules as executable instructions to be executed by the processor, wherein the plurality of modules comprises:
    a trace collection module configured to:
      identify one or more variable names and corresponding one or more variable types to generate a schema of the application programming interface;
    a schema inference module operatively coupled with the trace collection module configured to:
      generate and recognize the schema of the application programming interface and application programming interface data related to the application programming interface using request and response traces captured from bidirectional communications associated with the application programming interface,
      wherein the schema comprises the one or more variable names and the corresponding one or more variable types;
    a semantic profile generation module operatively connected with the schema inference module,
    wherein the semantic profile generation module comprises a predefined set of semantic profiles,
    wherein the semantic profile generation module is configured to:
      enable a user to define a custom semantic profile by a plugin mechanism;
      divide at least one variable name of the one or more variable names into a plurality of individual components based on a plurality of boundaries to filter out a plurality of words ineffective to the custom semantic profile;

expand a plurality of abbreviated components among the plurality of individual components into complete words based on a plurality of heuristics and a plurality of patterns of the complete words to match the plurality of individual components with one of a plurality of predefined semantic profile names associated with the predefined set of semantic profiles;

deduce the custom semantic profile for a plurality of parameters using the plurality of heuristics and pattern matching based on the plurality of patterns; and apply restrictions on a value pertaining to at least one variable type of the one or more variable types corresponding to the at least one variable name of the one or more variable names;

a test case generation module operatively connected to the schema inference module, and configured to:

generate a plurality of test cases using test data generated based on at least one semantic profile of the predefined set of semantic profiles and the custom semantic profile, wherein the plurality of test cases is a set of input data for testing of the application programming interface; and organize and group the generated test cases into at least one of several test suites, including regression test cases, security test cases, and negative test cases; and a test execution and learning module operatively connected to the test case generation module, wherein the test execution and learning module is configured to:

execute the generated test cases and collect results of the execution; and enable the user to override the generated test cases upon providing an input by the user in relation to the at least one semantic profile and the custom semantic profile.

2. The system as claimed in claim 1, wherein the plurality of boundaries comprises at least one of capital letters, underscores, and hyphens.

3. The system as claimed in claim 1, wherein the schema inference module is configured to generate and recognize the schema using at least one of a dictionary search, a pattern matching, and heuristics related to the application programming interface schema comprising the one or more variable names and the application programming interface data.

4. The system as claimed in claim 1, wherein the at least one semantic profile or the custom semantic profile comprises a variable name, a data type, actual values of a variable, a pattern of a value, properties of the value, length of variable strings, purpose of the variable, and a data profile, wherein the data profile comprises a validator function for returning a true value upon matching data with the at least one semantic profile or the custom semantic profile and a false value upon mismatching of the data with the at least one semantic profile or the custom semantic profile.

5. The system as claimed in claim 1, wherein a standard observability paradigm is implemented by injecting a set instrumented instructions into a microservice executable during operation of the processing subsystem using a plurality of techniques based on a language used in implementation of application programming interface.

6. The system as claimed in claim 1, wherein the semantic profile generation module is configured to validate the application programming interface data against each of the predefined set of semantic profiles and refine the match based on user input for the custom semantic profile.

7. The system as claimed in claim 1, wherein the collected application programming interface data is matched with the plurality of predefined semantic profile names and for each mismatch a Levenshtein distance calculation method is used to find a closest semantic profile.

8. The system as claimed in claim 1, wherein the application programming interface response is parsed and a response code, a status, and a response body is recognized in JSON format.

9. The system as claimed in claim 1, wherein the test execution and learning module is configured to continuously update the test cases by learning from the collected results of the executed test cases on a system under test, wherein the system under test is a system being tested for correct execution of the test cases.

10. A method for generating test data and test cases to examine an application programming interface comprising:

identifying, by a trace collection module of a processing subsystem to be executed by a processor of a computer-implemented system, one or more variable names and corresponding one or more variable types to generate a schema of the application programming interface;

recognizing, and generating, by a schema inference module of the processing subsystem, the schema of the application programming interface and application programming interface data related to the application programming interface, wherein the schema comprises the one or more variable names and the corresponding one or more variable types;

generating, by a semantic profile generation module of the processing subsystem, a predefined set of semantic profiles;

enabling, by the semantic profile generation module of the processing subsystem, a user to define a custom semantic profile by a plugin mechanism;

deducing, by the semantic profile generation module of the processing subsystem, the custom semantic profile for a plurality of parameters using a plurality of heuristics and pattern matching based on a plurality of patterns;

applying, by the semantic profile generation module of the processing subsystem, restriction on a value pertaining to at least one variable type of the one or more variable types corresponding to at least one variable name of the one or more variable names;

dividing, by the semantic profile generation module of the processing subsystem, the at least one variable name into a plurality of individual components based on a plurality of boundaries to filter out a plurality of words ineffective to the custom semantic profile;

expanding, by the semantic profile generation module of the processing subsystem, a plurality of abbreviated components among the plurality of individual components into complete words based on the plurality of heuristics and the plurality of patterns of the complete words to match the plurality of individual components with one of a plurality of predefined semantic profile names associated with the predefined set of semantic profiles;

generating, by a test case generation module of the processing subsystem, a plurality of test cases using test data generated based on at least one of the predefined set of semantic profiles and the custom semantic profile, wherein the plurality of test cases is a set of input data for testing the application programming interface;

organizing and grouping, by the test case generation module of the processing subsystem, the generated test cases into at least one of a plurality of test suites, including regression test cases, security test cases, and negative test cases;

executing, by a test execution and learning module of the processing subsystem, the generated test cases and collecting results of the execution, learning from the collected results of the executed test cases on a system under test; and enabling, by the test execution and learning module of the processing subsystem, the user to override the generated test cases upon providing an input by the user in relation to the at least one of the predefined set of semantic profiles and the custom semantic profile.

11. The method as claimed in claim 10, comprises automatically generating the test data and the test cases for the application programming interface.

12. The method as claimed in claim 10, comprises generating a JSON schema for the application programming interface request content and its response content.

13. The method as claimed in claim 10, comprises validating collected data against each of the predefined set of semantic profiles.

14. The method as claimed in claim 10, comprises refining the words matched with the plurality of predefined semantic profile names.

15. The method as claimed in claim 10, comprises generating synthetic test data using a dictionary search, pattern matching, and heuristics specific to the application programming interface.

16. The method as claimed in claim 10, comprises generating, test cases to test a plurality of aspects of the application programming interface upon generating the schema.

17. The method as claimed in claim 10, comprises executing, the generated test cases by using the processing subsystem.

18. The method as claimed in claim 10, comprising, wherein the plurality of test cases comprises a set of positive test cases and a set of negative test cases for testing the application programming interface.

19. The method as claimed in claim 10, comprises implementing, a correction or an update to the generated test cases or test suites based on the test results associated with the generated test cases.

20. A non-transitory computer-readable medium storing a instructions that, when executed by a processor, causes the processor to perform a method for generating test data and test cases to test the application programming interface, wherein the method comprises:

identifying, by a trace collection module of the processing subsystem stored as the instructions, one or more variable names and corresponding one or more variable types to generate a schema of the application programming interface;

recognizing and generating, by a schema inference module of the processing subsystem, the schema and application programming interface data related to the application programming interface, wherein the schema comprises the one or more variable names and the corresponding one or more variable types;

generating, by a semantic profile generation module of the processing subsystem, a predefined set of semantic profiles;

enabling, by the semantic profile generation module of the processing subsystem, a user to define a custom semantic profile by a plugin mechanism;

deducing, by the semantic profile generation module of the processing subsystem, the custom semantic profile for a plurality of parameters using a plurality of heuristics and pattern matching based on a plurality of patterns;

dividing, by the semantic profile generation module of the processing subsystem, at least one variable name of the one or more variable names into a plurality of individual components based on a plurality of boundaries to filter out a plurality of words ineffective to the custom semantic profile;

expanding, by the semantic profile generation module of the processing subsystem, a plurality of abbreviated components among the plurality of individual components into complete words based on the plurality of heuristics and the plurality of patterns of the complete words to match the plurality of individual components with one of a plurality of predefined semantic profile names associated with the predefined set of semantic profiles;

applying, by the semantic profile generation module of the processing subsystem, restrictions on a value pertaining to at least one variable type of one or more variable types corresponding to at least one variable name of the one or more variable names;

generating, by a test case generation module of the processing subsystem, a plurality of test cases using test data generated based on at least one of the predefined set of semantic profiles and the custom semantic profile, wherein the plurality of test cases is a set of input data for testing the application programming interface;

organizing and grouping, by the test case generation module of the processing subsystem, the generated test cases into at least one of a plurality of test suites, including regression test cases, security test cases, and negative test cases;

executing, by a test execution and learning module of the processing subsystem, the generated test cases and collecting results of the execution, learning from the collected results of the executed test cases on a system under test; and enabling, by the test execution and learning module of the processing subsystem, the user to override the generated test cases upon providing an input by the user in relation to the at least one of the predefined set of semantic profiles and the custom semantic profile.

* * * * *